United States Patent
Pletschet

(10) Patent No.: US 6,290,395 B1
(45) Date of Patent: Sep. 18, 2001

(54) LINEAR SLIDE ASSEMBLY

(75) Inventor: Timothy J. Pletschet, San Francisco, CA (US)

(73) Assignee: Techmetric, Inc., Concord, CA (US)

( * ) Notice: Subject to any disclaimer, the term of this patent is extended or adjusted under 35 U.S.C. 154(b) by 0 days.

(21) Appl. No.: 09/418,156

(22) Filed: Oct. 13, 1999

(51) Int. Cl.[7] ................................................. F16C 29/12
(52) U.S. Cl. ............................... 384/38; 384/37; 384/42
(58) Field of Search ............................. 384/10, 37, 38, 384/40, 42, 54, 57, 45

(56) References Cited

U.S. PATENT DOCUMENTS

| | | | |
|---|---|---|---|
| 4,390,216 | * | 6/1983 | Mueller et al. .......................... 384/54 |
| 4,637,738 | * | 1/1987 | Barkley .................................... 384/38 |
| 4,773,769 | * | 9/1988 | Church ..................................... 384/42 |
| 4,941,758 | * | 7/1990 | Osawa ...................................... 384/40 |
| 5,064,318 | * | 11/1991 | Cirillo .................................. 384/37 X |
| 5,176,454 | * | 1/1993 | Schlereth ................................. 384/45 |
| 5,247,891 | * | 9/1993 | Morita ................................. 384/45 X |
| 6,019,514 | * | 2/2000 | Feinstein ................................. 384/37 |

* cited by examiner

Primary Examiner—Thomas R. Hannon
(74) Attorney, Agent, or Firm—Gray Cary Ware & Freidenrich L.L.P.

(57) ABSTRACT

A linear slide assembly which includes a pair of parallel stationary ways and a carriage. A pair of parallel traveling ways are mounted to the carriage. One traveling way is mounted to the carriage by a fixed mounting and the other is mounted to the carriage by a laterally-compliant mounting. The laterally-compliant mounting includes a compliant mounting bar mounted to the carriage with flexures that allow some lateral movement. The compliant mounting also includes a stop that limits the lateral movement of the compliant traveling way.

12 Claims, 5 Drawing Sheets

FIG. 2E   FIG. 2A   FIG. 2F

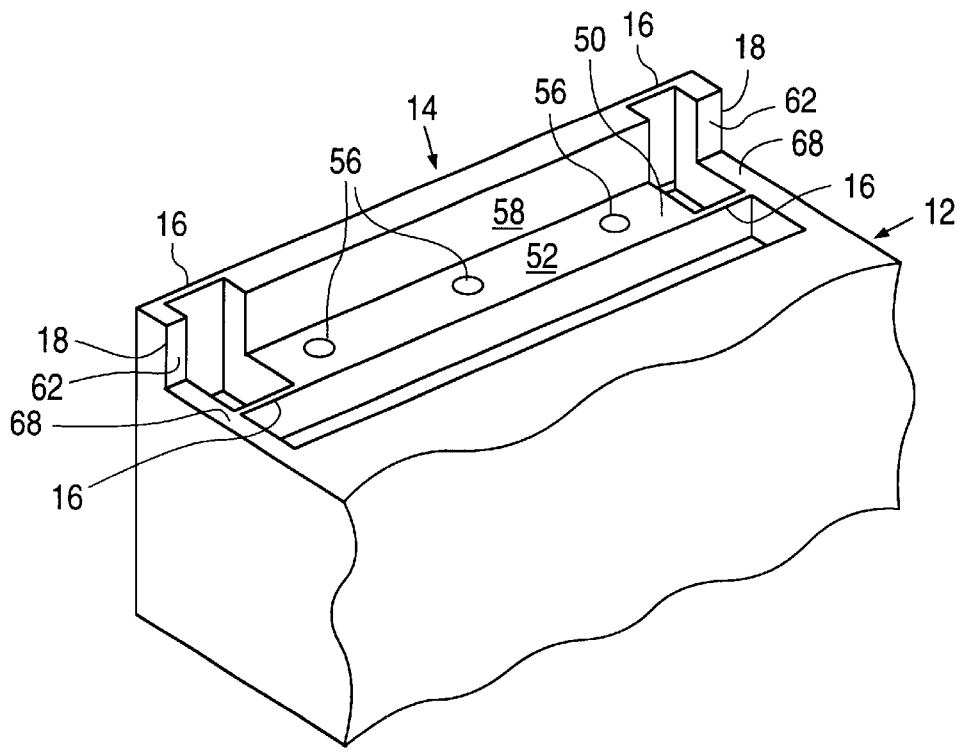
FIG. 7
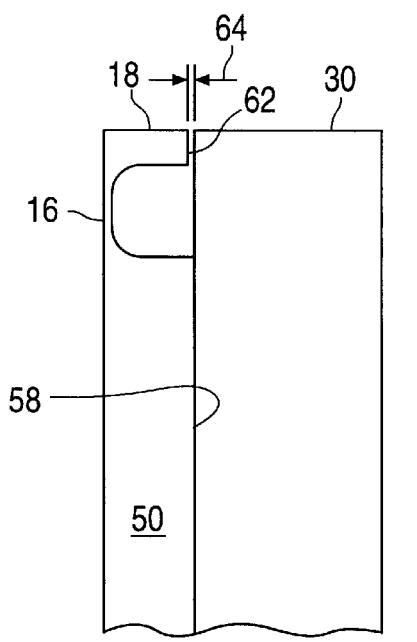 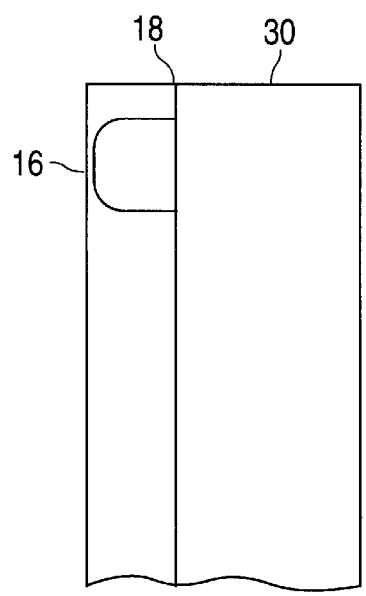
FIG. 8A        FIG. 8B

LINEAR SLIDE ASSEMBLY

BACKGROUND OF THE INVENTION

1. Field of the Invention

This invention relates generally to linear slide mechanisms, and relates more particularly to a linear slide assembly having a carriage with a laterally-compliant way mounting that incorporates flexures and lateral stops.

2. Description of the Relevant Art

Linear positioners are used to move and position objects along a linear path. Typically, a linear positioner has (1) a linear slide mechanism that guides a carriage along the linear path and (2) a source of motive power, such as a lead screw mechanism, to move the carriage. A linear slide mechanism typically has a stationary base, the moveable carriage, and slides or guide rails or ways to guide the carriage.

Design considerations for a linear slide mechanism may include factors such as positioning accuracy, load carrying capacity, and wear. It is desirable for a slide mechanism to require a low but consistent force for moving the carriage along the linear path, yet be relatively stiff or resistant to forces in any direction other than along the linear path.

One type of linear slide mechanism has two parallel, stationary ways mounted on a base, and two corresponding parallel ways mounted on a carriage. The contacting surfaces of the mating ways may be coated with a low-friction bearing strip material made from a polymer such as Turcite, which may be impregnated with bronze or brass particles. Turcite-lined ways are available from SKF Gmbh of Schweinfurt, Germany. A problem with using a solid material as a linear bearing is that some means must be provided to preload the ways to minimize lateral compliance and to compensate for wear. Also, some means must be provided to compensate for ways being not quite precisely parallel so that the carriage can run freely and precisely despite minor misalignments.

SUMMARY OF THE INVENTION

In accordance with the illustrated preferred embodiment, the present invention is a linear slide assembly having a carriage with a laterally-compliant way mounting. The linear slide assembly comprises a pair of parallel stationary ways and a carriage. A pair of parallel traveling ways are mounted to the carriage. One traveling way is mounted to the carriage by a fixed mounting and the other is mounted to the carriage by a laterally-compliant mounting. The laterally-compliant mounting includes a compliant mounting bar and flexures that permit movement in a direction transverse (lateral) to the direction of carriage movement. The compliant mounting further includes a stop that limits the transverse movement of the compliant traveling way. Preferably, the ways have a low friction bearing material, such as Turcite B or Delrin AF, between the stationary and traveling portions.

The linear slide assembly of the present invention is used in a linear positioning system having a motor-driven helical lead screw that engages a nut mounted to the carriage. Rotation of the lead screw moves the carriage linearly along the stationary ways. The linear positioner may be used in applications such as, for example, positioning test heads for testing or certifying disk drive media. More generally, the linear slide assembly of the present invention may be used in a wide variety of positioning systems, including open loop and closed loop, and may be operated in dirty environments, or while submerged in oil. The linear slide assembly may be used in linear motors and may be powered by various motors, such as stepper motors or servo motors.

The laterally-compliant way mounting on the carriage accommodates slight misalignment of the ways, yet provides a very stable and stiff platform for coupling the carriage to the ways. The laterally-compliant way mounting acts like a spring up to the point where the stop is engaged, and then acts like a solid mounting with no lateral compliance.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter. For example, it is assumed that the direction of carriage movement is horizontal and that an upper mounting surface of the carriage is also horizontal, and references below to "vertical" or "horizontal" are based on that assumed orientation. However, the present invention need not be oriented horizontally; the assumed orientation is adopted solely for ease of description and is not intended to be limiting. As another example, the terms "way" and "ways" are used herein to describe the structures used to guide the linear movement of the positioner. Other, comparable terms for the guiding structures are: guide, rail, slide, guide rail, slide rail, and rail guide, and the like. The terms "way" and "ways" are intended to encompass all of the other comparable terms without limitation. Accordingly, resort to the claims is necessary to determine the inventive subject matter.

BRIEF DESCRIPTION OF THE DRAWINGS

FIGS. 2A–2F are views of a carriage used in the linear slide assembly of the present invention.

FIG. 2A is a bottom view,

FIGS. 2B and 2C are opposing side views,

FIG. 2D is a top view, and

FIGS. 2E and 2F are opposing end views of the carriage.

FIG. 7 is a perspective view of a portion of the bottom of the carriage showing a compliant mounting.

FIGS. 8A and 8B are detail views of a stop incorporated into the compliant mounting portion of the carriage.

DETAILED DESCRIPTION OF THE PREFERRED EMBODIMENTS

Figure 1A:
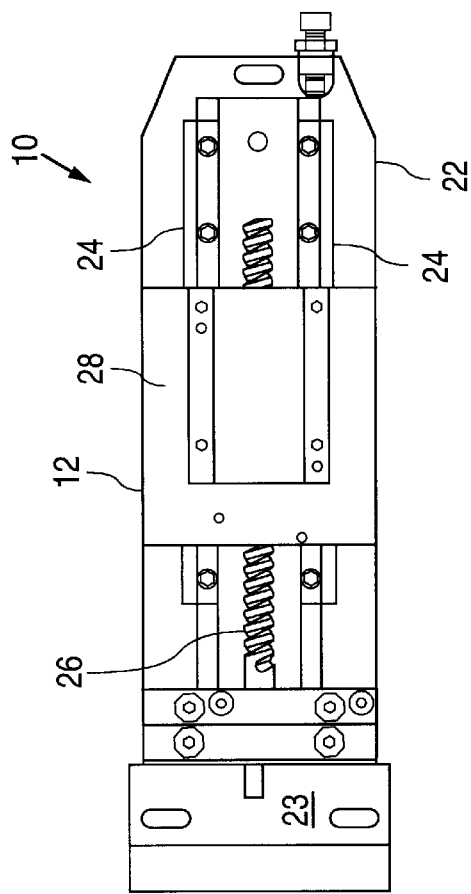
FIGS. 1A, 1B, and 1C are top, side, and end views, respectively, of a linear positioning device that includes a linear slide assembly according to the present invention.

The figures of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The present invention is a linear slide assembly 10 having a carriage 12 with a laterally-compliant way mounting 14 that incorporates flexures 16 and lateral stops 18 (FIGS. 1, 7–8).

Figure 1B:
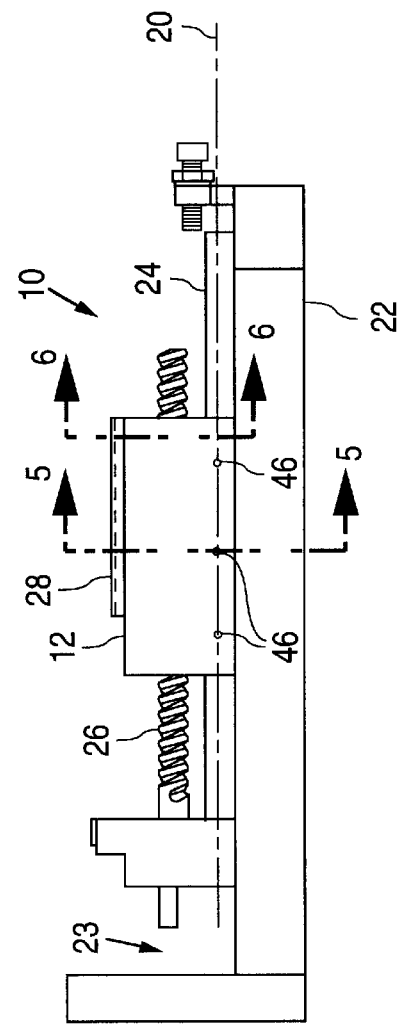
Figure 1C:
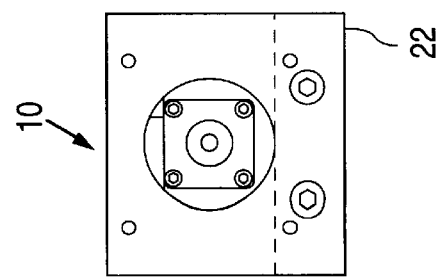
Figure 2D:
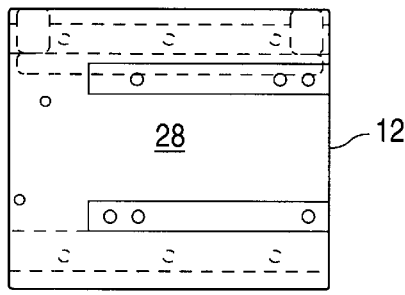
Figure 2C:
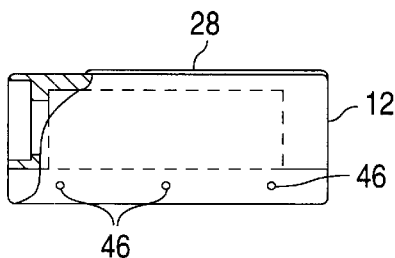
Figure 2B:
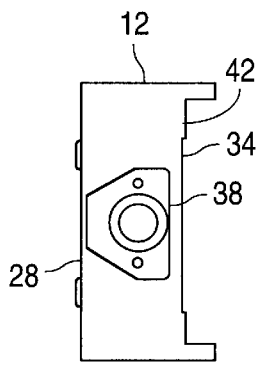
Figure 2B:
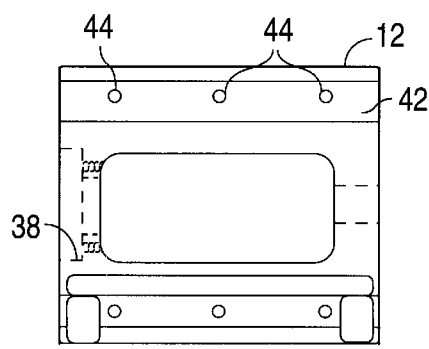
Figure 2B:
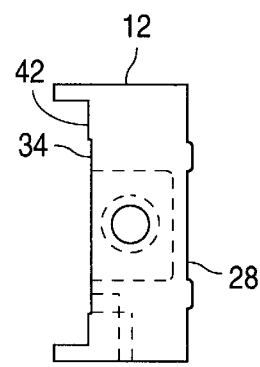
Figure 2B:
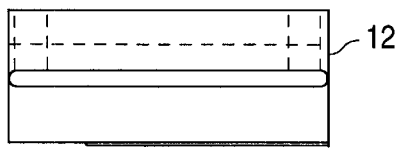

The linear slide assembly 10 is part of a linear positioner, some of which is shown in FIGS. 1A–1C. The linear positioner consists primarily of a stationary base 22, a pair of parallel stationary ways 24 mounted to the base, the carriage 12 that slides along the ways, a helical lead screw 26, and a nut (not shown) that is mounted to the carriage and that engages the lead screw. The lead screw 26 is rotatably driven by a stepper motor (not shown) located at 23 to move the carriage 12 along the ways 24. The stationary ways 24 define a plane 20 parallel to the direction of carriage movement. The linear positioner may be used in many applications, such as, for example, positioning test heads for testing or certifying disk drive media. The plane 20 and the direction of carriage movement are usually horizontal.

Figure 3:
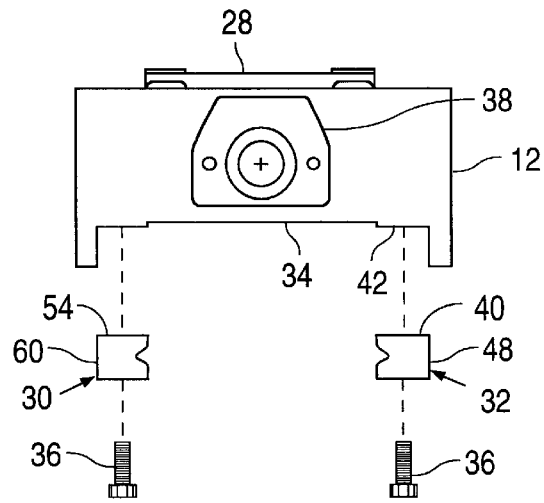
FIG. 3 is an exploded end view of the carriage and two ways attached to the carriage with bolts.
Figure 4B:
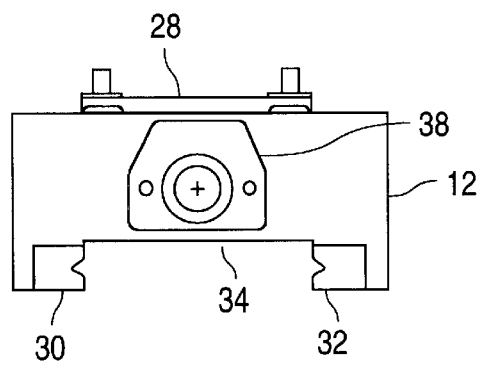
FIGS. 4A and 4B are bottom and end views, respectively, of the carriage with attached ways.
Figure 4A:
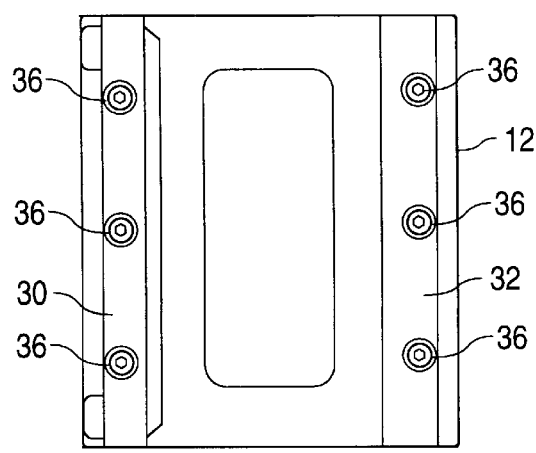

FIGS. 2–4 show one embodiment of the carriage 12 in more detail. The carriage 12 is preferably machined from a block of 7075-T6 aluminum. The carriage has a top surface 28 that provides a place for mounting whatever is to be positioned by the linear positioner. Two traveling ways 30, 32 are mounted to an underside 34 of the carriage with bolts 36. The traveling ways 30, 32 mate with and slide along the stationary ways 24, thereby guiding the carriage in linear motion. A recessed area 38 of the carriage provides a place for mounting the nut (not shown) that engages the lead screw. particular anti-backlash nut, suitable for use with the linear slide assembly of the present invention, is disclosed in co-pending and co-owned patent application Ser. No. 09/411,875, entitled Anti-Backlash Nut For Lead Screw, filed on Oct. 4, 1999.

The two traveling ways 30, 32 are mounted on the carriage 12 parallel to each other. Traveling way 30 is compliantly mounted to the carriage 12 by the laterally-compliant way mounting 14 (FIG. 7), which will be explained in more detail below. Traveling way 32 is fixedly mounted to the carriage 12. A flat surface 42 on the underside 34 of the carriage 12 contacts a flat upper surface 40 of the fixed traveling way 32 to provide vertical location for the way. Tapped holes 44 (FIG. 2A) in the surface 42 receive the bolts 36 that attach the fixed traveling way 32 to the carriage 12. The bolts 36 are cap screws, and are recessed into counterbored holes in the way 32. Three set screws 46 contact a side surface 48 of the way 32 to provide a lateral adjustment for the lateral location of the fixed traveling way 32.

The laterally-compliant way mounting 14 allows the compliantly-mounted traveling way 30 to move laterally by a limited amount, and also provides a preload force against the ways. As best shown in FIG. 7, the laterally-compliant way mounting 14 includes a mounting bar 50 that is connected to the rest of the carriage 12 by four flexures 16. The flexures 16 allow the mounting bar 50 and the attached way 30 to move laterally relative to the direction of travel of the carriage 12. The mounting bar 50 has a flat surface 52 that is coplanar with flat surface 42 and that contacts a flat surface 54 (FIG. 3) of the way 30 to provide vertical location for the way 30. Tapped holes 56 in the surface 52 receive bolts 36 to attach the way 30 to the mounting bar 50. A flat side surface 58 of the bar contacts a flat side surface 60 of the way 30 to provide lateral location for the way 30.

When the way 30 is mounted to the mounting bar 50, the ends of the way 30 extend beyond the ends of the mounting bar 50 so that the ends of the way 30 are adjacent the lateral stops 18, as shown in FIGS. 8A and 8B. The lateral stops 18 have flat vertical surfaces 62 that are parallel to the side surface 58 of the mounting bar 50. The surfaces 62 are offset by a small amount, preferably 0.001 inch or less, from the surface 58, as shown by gap 64 in FIG. 8A. The offset allows the way 30 to move laterally by the offset distance before it contacts the lateral stops 18, as shown in FIG. 8B.

As an alternative to an offset machined into the carriage, the surface 58 of the mounting bar 50 and the surfaces 62 of the lateral stops 18 may be coplanar and the offset can be provided by a shim between the way 30 and surface 58 of the mounting bar 50. Designing the surfaces to be coplanar permits a milling tool to cut the surfaces in a single pass.

In order to provide clearance for the way 30 to move laterally relative to the rest of the carriage 12, there is a relief machined into the carriage at surfaces 68. The surfaces 68 are relieved by about 0.0007 inches relative to the surface 52 on the mounting bar 50 (assuming that the surface 54 of the way 30 is flat) so that the ends of the way 30 do not drag along the carriage. The clearance also limits vertical deflection of the way 30 in response to a vertical load such as the weight of the carriage and attached structures.

Figure 5:
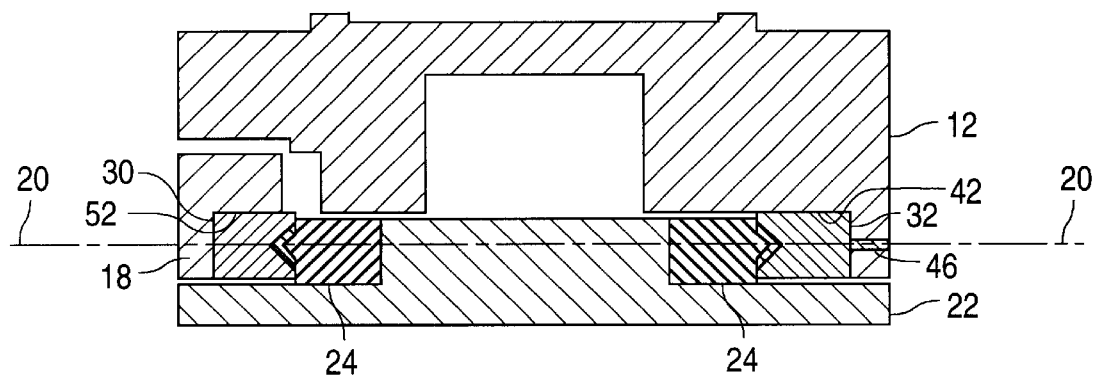
FIG. 5 is a sectional view of the linear slide assembly of the present invention, and is taken along section line 5—5 of FIG. 1B.
Figure 6:
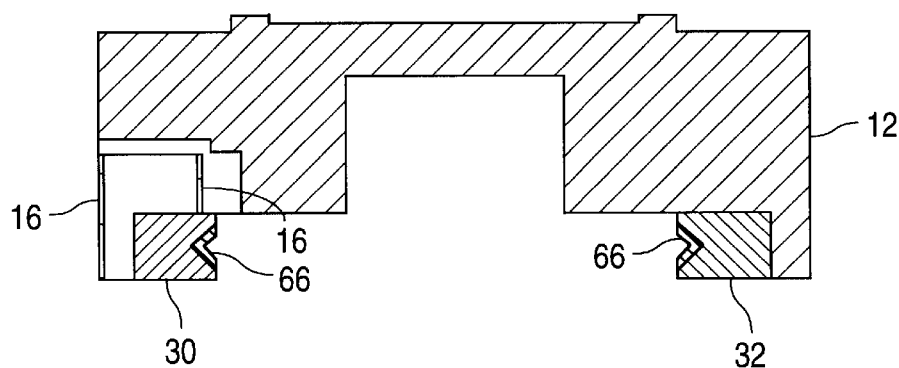
FIG. 6 is a sectional view of the carriage of the present invention, and is taken along section line 6—6 of FIG. 1B.

The laterally-compliant way mounting 14 thus provides limited lateral movement of the way 30 and also provides a rigid stop at the outer limit of the lateral movement. The set screws 46 are adjusted to close any between the traveling ways 30, 32 and the fixed ways 24 by moving the fixed way 32 to the left as viewed in FIG. 5. The set screws 46 are also adjusted to set the parallelism between the ways. Once the ways are in contact, further adjustment of the set screws 46 causes the flexures 16 to bend and the complaint way mounting to move laterally outward. This lateral movement of the complaint way mounting applies a spring force or preload against the ways. The offset 64 is selected so that when the spring force from the flexures 16 is as desired, there remains a gap between the way 30 and the contact surfaces 62 of the stops 18 to provide some lateral compliance for the ways in order to compensate for slight misalignments or non-parallelism of the ways. The limit of lateral compliance is reached, however, when the flexures deflect so much that the way 30 contacts the contact surfaces 62 of the stops 18. The laterally-complaint way mounting 14 thus provides a small but limited amount of lateral movement for the way 30 and an adjustable preload force.

The contact surfaces 66 of the traveling ways 30, 32 are preferably coated with a low-friction bearing strip material, such as Turcite and, in particular, brass-impregnated Turcite-B Slydway from Busak+Shamban. Suitable Turcite-lined ways are available from SKF Gmbh of Schweinfurt, Germany. Delrin AF is another material that can be used for the low-friction bearing strip material. If the contact surfaces wear during use, the desired preload force can be reset by adjusting the set screws 46. Alternatively, the preload force can be adjusted by shimming between the side surface 60 of the way 30 and the side surface 58 of the mounting bar 50.

As an alternative to the four flexures 16, the laterally-compliant way mounting can be coupled to the rest of the carriage with a different number of flexures. For example, the connection can be made with one flexure at each end of the mounting 50. Two flexures provide less stiffness to vertical loading than the four flexures 16.

The flexures 16 disclosed herein are illustrated as being integral with the carriage 12. In other words, the flexures are formed in the process of machining the carriage from a single piece of material. Consequently, the flexures are composed of the same material as the carriage. Alternatively, the flexures may be separate pieces (preferably composed of metal such as spring steel) and attached at one end to the mounting bar and at the other end to the main body of the carriage. Separate flexures permits the flexures to be composed of a material other than that of the carriage.

From the above description, it will be apparent that the invention disclosed herein provides a novel and advantageous linear slide assembly. The foregoing discussion discloses and describes merely exemplary methods and embodiments of the present invention. As will be understood by those familiar with the art, the invention may be embodied in other specific forms without departing from the spirit or essential characteristics thereof. For example, the linear slide assembly can be used as a component of a positioner that has a servo motor or other type of linear motive device different from the lead screw and stepper motor motive device disclosed herein. Accordingly, the disclosure of the present invention is intended to be illustrative, but not limiting, of the scope of the invention, which is set forth in the following claims.

What is claimed is:

1. A linear slide assembly comprising:

a stationary guiding surface; and a movable carriage having bearing means coupled to the stationary guiding surface for guiding the carriage in movement along the stationary guiding surface;

wherein the bearing means includes two pairs of flexures for permitting movement of the bearing means transverse to the direction of carriage movement, wherein each pair of flexures includes two transversely-spaced flexures; and wherein the bearing means includes a stop that limits the transverse movement of the bearing means.

2. A linear slide assembly comprising:

a pair of parallel stationary ways;

a carriage with a pair of parallel traveling ways mounted to the carriage, wherein the traveling ways mate with the stationary ways to provide a sliding bearing for guiding the carriage in linear movement, and wherein the ways define a plane parallel to the direction of carriage movement;

wherein one traveling way is a fixed traveling way that is mounted to the carriage by a fixed mounting and the other traveling way is a compliant traveling way that is mounted to the carriage by a transversely compliant mounting;

wherein the transversely compliant mounting includes a compliant mounting bar and flexures that permit movement of the compliant traveling way transverse to the direction of carriage movement, wherein the compliant mounting bar has two ends and the flexures include two transversely-spaced flexures at each end of the compliant mounting bar that permit transverse movement of the compliant mounting bar; and wherein the compliant mounting further includes a stop that limits the transverse movement of the compliant traveling way.

3. A linear slide assembly as recited in claim 2 wherein the fixed mounting and compliant mounting include respective coplanar surfaces parallel to the plane of the ways, and wherein the coplanar surfaces are locating surfaces for mounting the traveling ways.

4. A linear slide assembly as recited in claim 2 wherein the fixed mounting of the fixed traveling way to the carriage includes transversely-extending screws that provide a transverse adjustment for the fixed traveling way.

5. A linear slide assembly as recited in claim 2 wherein the compliant mounting bar has a surface that is a lateral locating surface for the compliant traveling way.

6. A linear slide assembly as recited in claim 2 wherein the stop is provided by contact between the carriage and the compliant traveling way.

7. A linear slide assembly as recited in claim 2 wherein the carriage is composed of a single unitary piece of material.

8. A linear slide assembly as recited in claim 2 wherein mating surfaces of the ways are coated with a low-friction solid material.

9. A linear slide assembly as recited in claim 2 wherein the flexures are deflected from a static position to provide a preload force between the stationary and traveling ways.

10. A linear slide assembly as recited in claim 2 wherein the compliant mounting bar has two ends, and wherein each end of the compliant mounting bar is coupled to the remainder of the carriage by a pair of flexures that are parallel and spaced laterally apart.

11. A linear slide assembly comprising:

a pair of parallel stationary ways;

a carriage with a pair of parallel traveling ways mounted to the carriage, wherein the traveling ways mate with the stationary ways to provide a sliding bearing for guiding the carriage in linear movement, and wherein the ways define a plane parallel to the direction of carriage movement;

wherein one traveling way is a fixed traveling way that is mounted to the carriage by a fixed mounting and the other traveling way is a compliant traveling way that is mounted to the carriage by a transversely compliant mounting;

wherein the fixed mounting and compliant mounting include respective coplanar surfaces parallel to the plane of the ways, and wherein the coplanar surfaces are locating surfaces for mounting the traveling ways;

wherein the transversely compliant mounting includes a compliant mounting bar and flexures that permit movement of the compliant traveling way transverse to the direction of carriage movement and in the plane of the ways, wherein the compliant mounting bar has two ends and the flexures include two transversely-spaced flexures at each end of the compliant mounting bar that permit transverse movement of the compliant mounting bar;

wherein the flexures provide a preload force between the stationary and traveling ways; and wherein the compliant mounting further includes a stop that limits the transverse movement of the compliant traveling way, wherein the stop is provided by contact between the carriage and the compliant traveling way.

12. A linear slide assembly as recited in claim 11 wherein the compliant mounting bar has two ends, and wherein each end of the compliant mounting bar is coupled to the remainder of the carriage by a pair of flexures that are parallel and spaced laterally apart.

* * * * *